(12) United States Patent
Gill et al.

(10) Patent No.: US 7,333,304 B2
(45) Date of Patent: Feb. 19, 2008

(54) CPP SENSOR HAVING HARD BIAS STABILIZATION PLACED AT BACK EDGE OF THE STRIPE

(75) Inventors: Hardayal Singh Gill, Palo Alto, CA (US); Kuok San Ho, Santa Clara, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 351 days.

(21) Appl. No.: 10/981,903

(22) Filed: Nov. 4, 2004

(65) Prior Publication Data

US 2006/0092582 A1   May 4, 2006

(51) Int. Cl.
*G11B 5/39* (2006.01)
(52) U.S. Cl. ............................. 360/324.12
(58) Field of Classification Search ........... 360/324.12, 360/324.2, 327.31, 324.11, 324.1, 317
See application file for complete search history.

(56) References Cited

U.S. PATENT DOCUMENTS

| | | | |
|---|---|---|---|
| 5,079,035 A | 1/1992 | Krounbi et al. ............. 427/130 |
| 6,005,753 A * | 12/1999 | Fontana et al. ........... 360/324.2 |
| 6,487,056 B1 | 11/2002 | Gibbons et al. ........ 360/327.31 |
| 6,680,829 B2 * | 1/2004 | Chen et al. ................. 360/319 |
| 6,724,583 B2 * | 4/2004 | Seigler et al. ......... 360/324.12 |
| 6,735,850 B1 * | 5/2004 | Gibbons et al. ......... 29/603.07 |
| 7,031,119 B2 * | 4/2006 | Watanabe et al. ........... 360/313 |
| 7,035,061 B2 * | 4/2006 | Singleton et al. ...... 360/324.12 |
| 7,035,062 B1 * | 4/2006 | Mao et al. ............... 360/324.2 |
| 7,154,714 B2 * | 12/2006 | Fukui et al. ........... 360/324.12 |
| 7,158,351 B2 * | 1/2007 | Nakamoto et al. .......... 360/319 |
| 7,167,347 B2 * | 1/2007 | Sato et al. ................ 360/324.1 |
| 2002/0114111 A1 * | 8/2002 | Zhu ........................ 360/324.1 |
| 2002/0131215 A1 | 9/2002 | Beach ..................... 360/324.2 |
| 2003/0206384 A1 | 11/2003 | Hoshiya et al. ......... 360/324.12 |
| 2004/0047087 A1 | 3/2004 | Fukui et al. ........... 360/324.12 |
| 2004/0114285 A1 | 6/2004 | Ishikawa et al. ....... 360/324.12 |

FOREIGN PATENT DOCUMENTS

JP    10-284768    10/1998

* cited by examiner

*Primary Examiner*—Angel Castro
(74) *Attorney, Agent, or Firm*—Zilka-Kotab, PC

(57) ABSTRACT

A current perpendicular to plane (CPP) having hard magnetic bias layers located at the back of the sensor, opposite the air bearing surface. The bias layer is magnetostatically coupled with the free layer to bias the free layer in a desired direction parallel with the ABS. First and second magnetic shield layers may be provided at either lateral side of the sensor to provide exceptional track width definition. The placement of the bias layer at the back of the sensor makes possible the addition of magnetic shields at the sides of the sensor.

20 Claims, 4 Drawing Sheets

CPP SENSOR HAVING HARD BIAS STABILIZATION PLACED AT BACK EDGE OF THE STRIPE

FIELD OF THE INVENTION

The present invention relates to giant magnetoresistive (GMR) sensors and more particularly to a current perpendicular to plane (CPP) sensor having a hard magnetic bias layer formed at the back edge of the sensor opposite the air bearing surface (ABS).

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for increased data rate and data capacity, researchers have recently been focusing their efforts on the development of perpendicular recording systems. A traditional longitudinal recording system stores data as magnetic bits oriented longitudinally along a track in the plane of the surface of the magnetic disk. This longitudinal data bit is recorded by a fringing field that forms between a pair of magnetic poles separated by a write gap. A perpendicular recording system, on the other hand, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole.

Along with the recent focus on perpendicular recording, researcher have been focusing on developing practical current perpendicular to plane (CPP) sensors such as CPP GMR sensors. This is because such CPP sensors are particularly suited for use in perpendicular recording systems. This is due in part to the ability of CPP sensor to have a much smaller gap thickness and therefore to record much shorter bits of data.

The demand for increased data rate has also challenged engineers to develop magnetic recording devices having ever narrower, well defined track widths. Whereas the bit length can be tightly defined by the presence of magnetic shield at the top and bottom of the sensor, now such shielding has been available for clearly defining the track width of the sensor. Free layer biasing has required the use of high coercivity magnetic materials at either lateral side of the sensor. Since the magnetic moments of these layers are essentially fixed, they do not act as magnetic shields.

Another problem that emerges with the use of such laterally disposed hard bias layers, when used in sensors of ever decreasing size is that the free layer becomes excessively stiff. The magnetostatic coupling provided by the bias layers at either side of the free layer can saturate the free layer, when the free layer becomes very small. This results in a loss of sensitivity and performance of the head.

Therefore there is a strong felt need for a biasing scheme that can bias the free layer in an exceedingly small magnetoresistive sensor. There is also a strong felt need for a sensor design that can provide an exceptional narrow well defined trackwidth. Such a sensor would preferably be useful in a current perpendicular to plane (CPP) sensor, since such sensor provide the most promise for use in future perpendicular recording systems.

SUMMARY OF THE INVENTION

The present invention provides a current perpendicular to plane (CPP) GMR sensor having side shields formed at either side of the sensor to define the track width of the sensor as well as top and bottom shields to define the bit length. The sensor has a hard bias structure at the back of the sensor opposite the air bearing surface (ABS).

The bias layer formed behind the sensor is constructed of a high coercivity magnetic material such as CoPtCr and preferably includes a seed layer formed thereunder. The side shields may be constructed of a magnetically soft material such as NiFe.

The presence of the hard bias structure provides several advantages. Putting the hard bias layer at the back of the sensor rather than at the sides of the sensor allows the side shields to be included at either side of the sensor. The side shields provide excellent track resolution by avoiding adjacent track interference. This is extremely important for present and future high track density recording systems.

The presence of the bias layer at the back of the sensor also improves free layer sensitivity by moving the biasing away from the ABS end of the sensor, the ABS end of the free layer being most responsive to signals from an adjacent magnetic medium.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
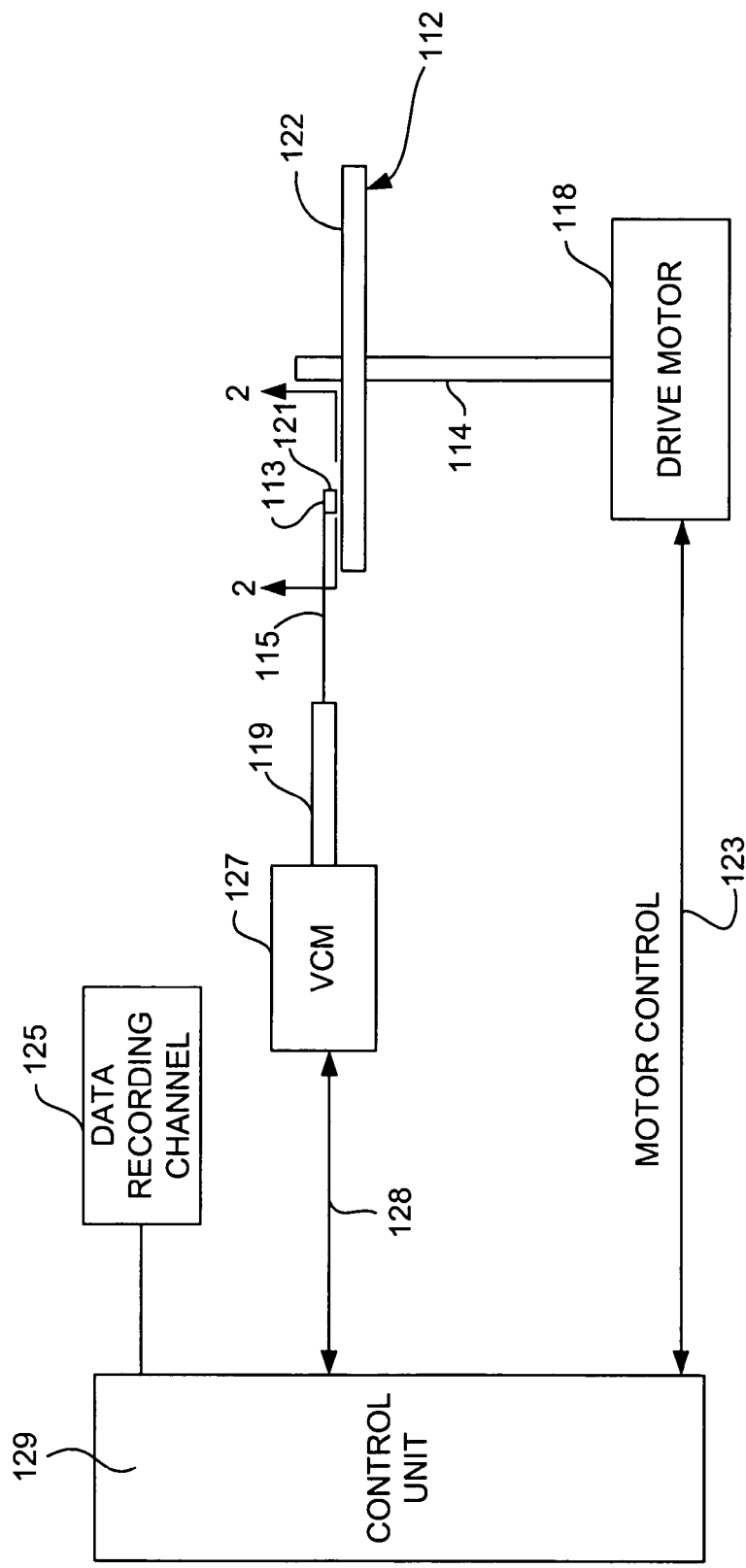
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
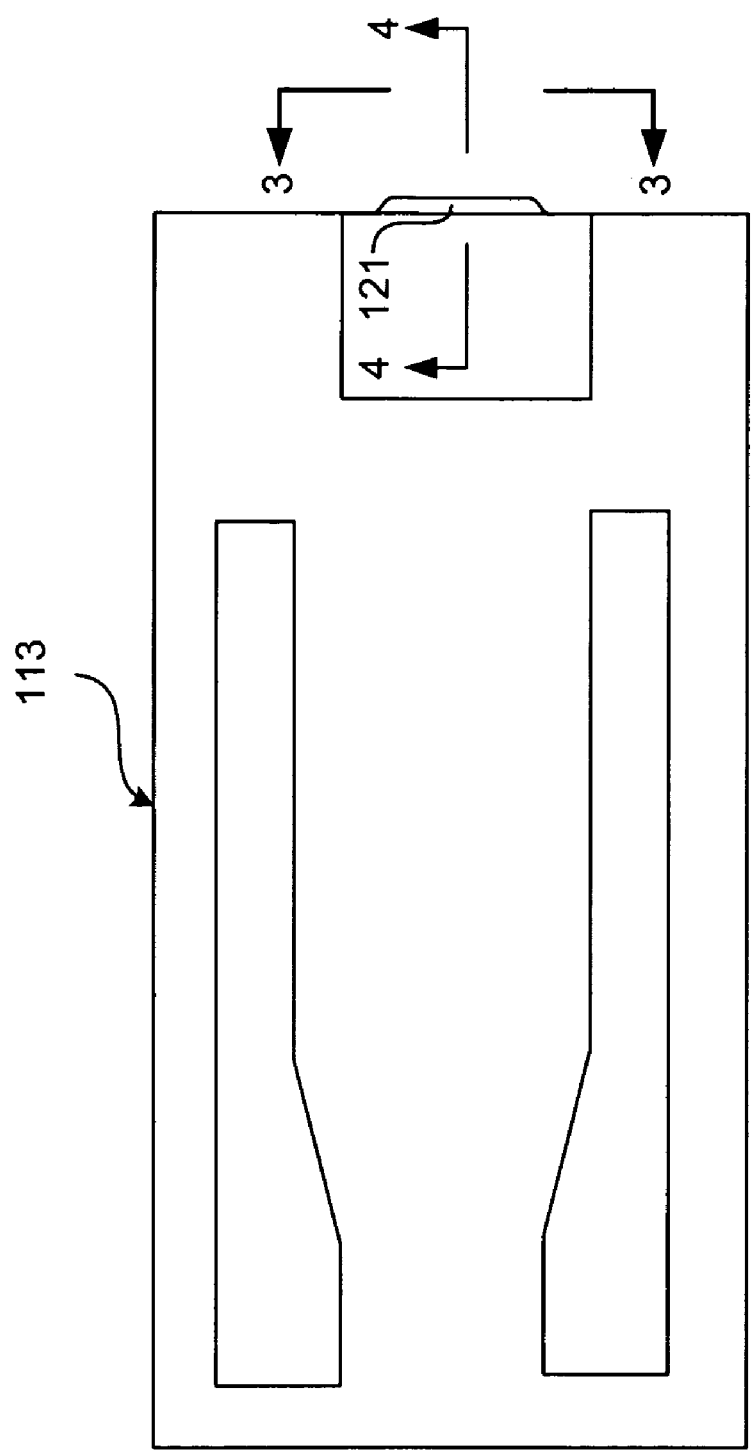
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
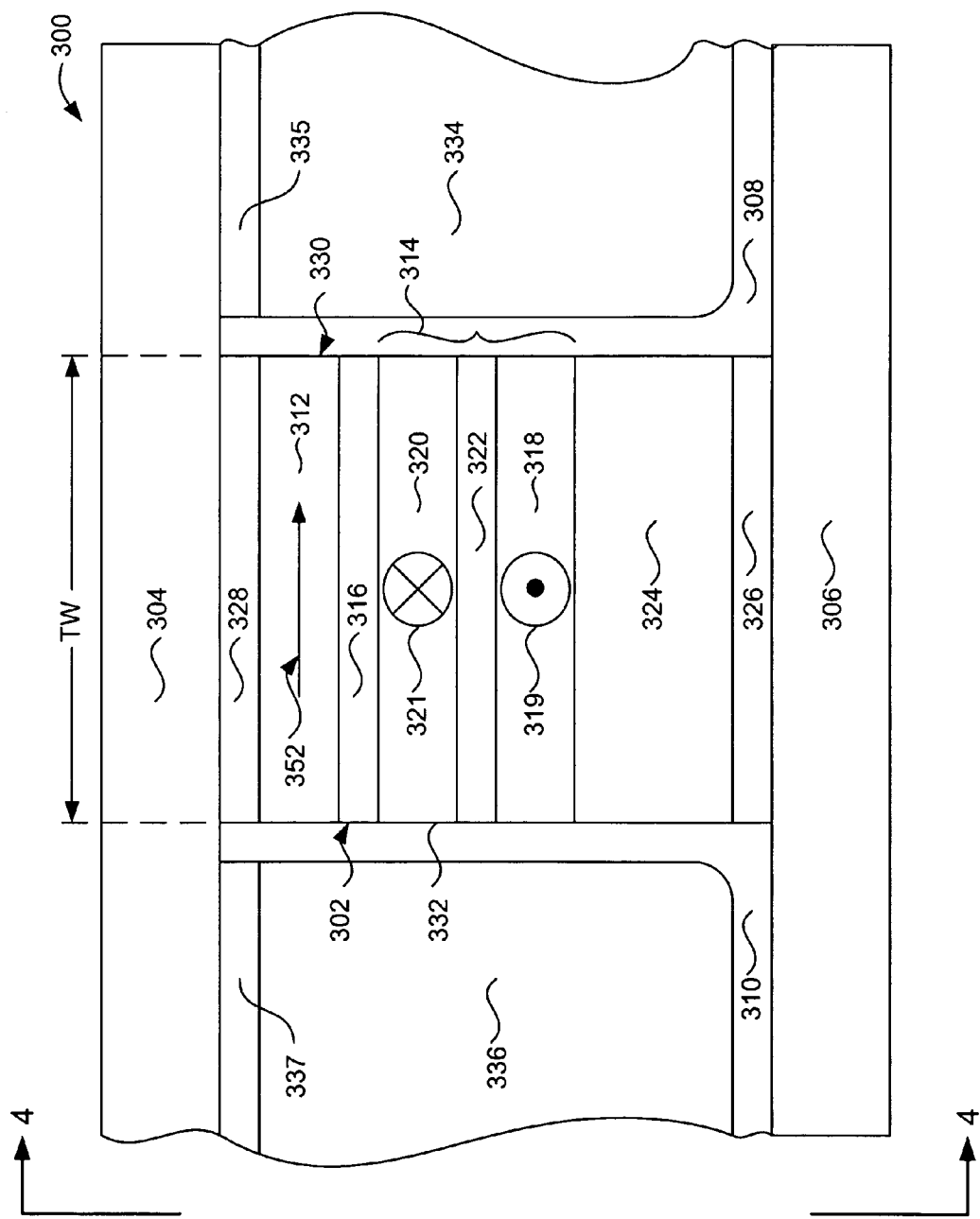
FIG. 3; is a cross sectional view of a sensor according to an embodiment of the invention, taken from line 3-3, of FIG. 2, shown enlarged and rotated 90 degrees counterclockwise.

With reference now to FIG. 3, a magnetoresistive sensor 300 according to an embodiment of the invention includes a magnetoresistive sensor element or sensor stack 302, sandwiched between first and second leads 304, 306. The first and second leads 304, 306 can be constructed of an electrically conductive, magnetic material such as NiFe and can thereby serve as magnetic shields as well as leads. First and second insulation layers 308, 310 extend laterally from the sides of the sensor stack 302 and extend across at least one of the leads 304, 306. The insulation layers 308, 310 can be for example $Al_2O_3$, deposited by a conformal deposition processes that causes the insulation layers to have a uniform thickness over the bottom shield 306 as well as at the sides of the sensor stack 302.

The sensor stack includes a magnetic free layer 312, a pinned layer structure 314 and a non-magnetic, electrically conductive spacer layer 316, constructed of, for example Cu. It should be pointed out at this point that, while the present invention is being described in terms of a GMR sensor, the present invention could also be practiced in a tunnel valve (TMR) sensor in which a case a thin, non-magnetic, electrically insulating barrier layer, such as $Al_2O_3$ would be disposed between the free layer 312 and the pinned layer structure 314, rather than the non-magnetic, electrically conductive spacer layer 316. The free layer can be constructed of several magnetic materials such as Co or CoFe, or of a combination of layers of different magnetic materials.

The pinned layer structure may be a simple pinned structure or an antiparallel pined (AP pinned) structure, and may be either self pinned or AFM pinned. For purposes of clarity, the pinned layer structure 314, is described as an AP pinned layer structure having first and second ferromagnetic layers 318, 320, which are antiparallel coupled across a non-magnetic, electrically conductive AP coupling layer 322 such as Ru. The first and second magnetic layers 318, 320 can be constructed of, for example CoFe, NiFe or some combination of these or other materials. A layer of antiferromagnetic material (AFM layer) 324 is disposed beneath the pinned layer structure 314, and can be for example PtMn, IrMn or some other antiferromagnetic material. The AFM layer 324 is exchange coupled with the first magnetic layer 318 and strongly pins the magnetic moments of the magnetic layers as indicated by symbols 319, 321.

The sensor stack 302 also may include a seed layer 326 formed at the bottom of the sensor stack 302, which can be used to initiate a desired crystalline growth in the layers of the sensor stack 302. A capping layer 328, such as for example Ta or some other suitable material may be provide at the top of the sensor stack 302 to protect the layers of the sensor stack from damage during manufacturing processes such as annealing.

With continued reference to FIG. 3 the sensor stack 302 has first and second lateral sides 330, 332 that define the track width (TW) of the sensor. The sensor 300 includes first and second magnetic shields 334, 336, which extend laterally outward from the sides of the sensor, being separated from the sensor by the insulation layers 308, 310. Optional third and fourth insulation layers 335, 337 may be provided between the side shields 334, 336 and the top shield 304.

The shields 334, 336 are constructed of a low coercivity magnetic material such as NiFe, and act to absorb any magnetic fields located outside of the track width TW of the sensor. In this way the shields allow the track width TW to be very accurately defined, preventing any reading of adjacent track signals. This is a great advantage for current and future magnetic recording systems, wherein the track densities are increased to extremely high densities. The placement of magnetically soft shields 334, 336 at the sides of the sensor as well as at the top and bottom of the sensor 304, 306 is made possible by a novel biasing arrangement for biasing the moment of the free layer, as will be explained in more detail herein below.

Figure 4:
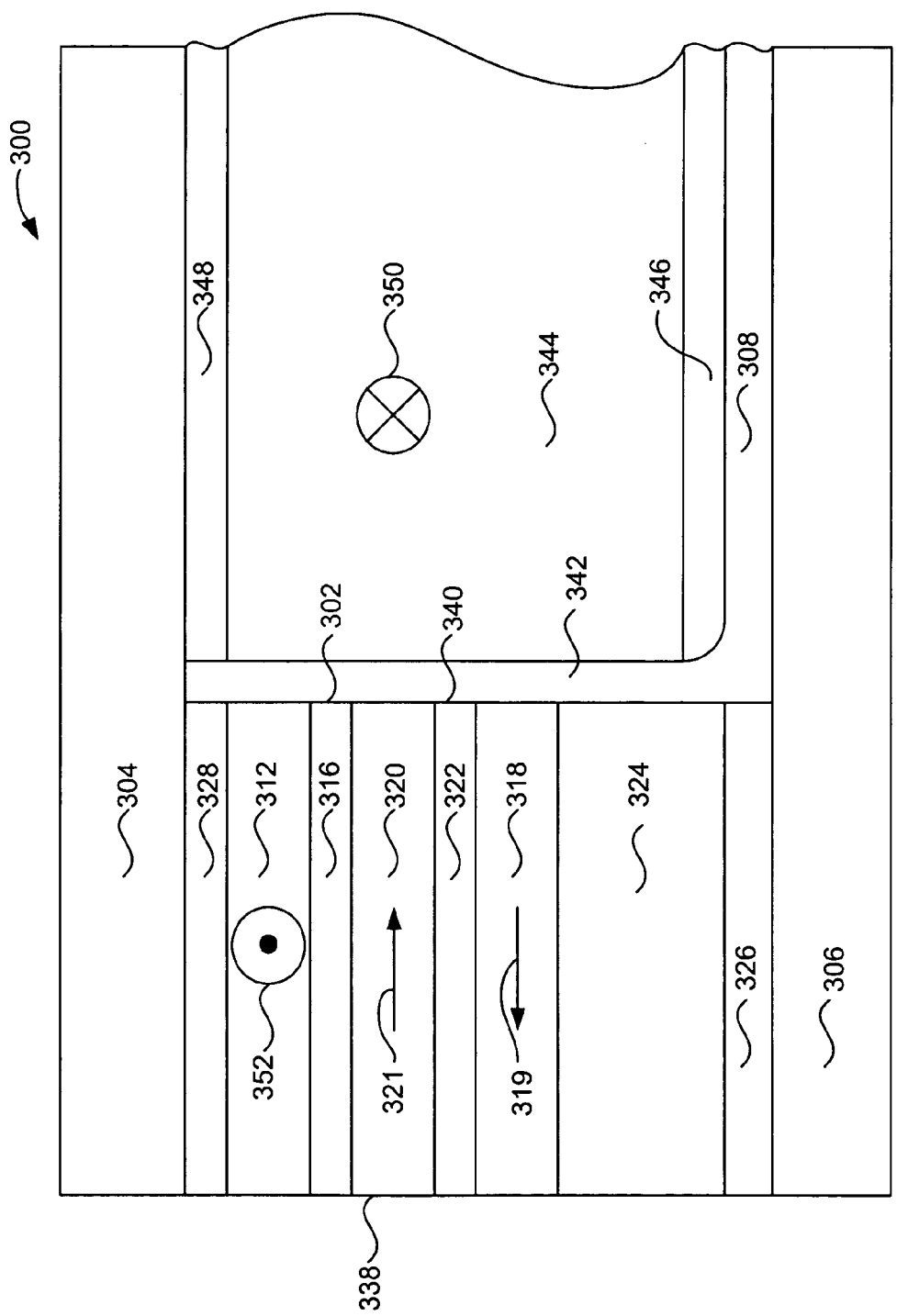
FIG. 4 is a top down view of the sensor of FIG. 3, taken from line 3-3 of FIG. 2, shown enlarged and rotated 90 degrees clockwise.

With reference now to FIG. 4, which illustrates a cross sectional view of the sensor 300 viewed perpendicular to the ABS, the sensor stack 302 has a front ABS edge 338 and a back edge 340 at the back of the stripe height opposite the ABS edge 338. An insulation layer 342 covers the back edge 340 of the sensor stack 302, and also covers the first shield 306. It should be pointed out at this point that although the insulation layers 308, 310 (FIG. 3) and 342 (FIG. 4) are shown with different element numbers, they are all actually part of a single layer of insulation that wraps around the sides 330, 332 (FIG. 3) and back 340 (FIG. 4) of the sensor stack 302 and covers all of the bottom shield 306 that is not covered by the sensor stack 302. This insulation layer, preferably $Al_2O_3$, can be deposited in a single conformal deposition after the sensor stack has been defined by an ion milling or other material removal process that will be familiar to those skilled in the art.

With continued reference to FIG. 4, a hard bias layer 344, which can be constructed of CoPtCr or some other suitable high coercivity hard magnetic material extends from the back of the sensor stack 302. The hard bias layer 344 is separated from the sensor stack 302 by the insulation layer 342 in order to prevent shunting of sense current through the hard bias layer 344. The hard bias layer can extend a significant distance backward, away from the ABS in the stripe height direction. A seed layer 346 may be provided at the bottom of the hard bias layer 344. The seed layer 346 is preferably an electrically conductive material that can be sputter deposited, providing an electrically conductive substrate on which to electroplate hard bias layer 344. The seed layer 346 is also preferably a material that has a desired crystalline structure in order to promote a desired crystalline structure in the hard bias layer 344. The crystalline structure of the hard bias layer 344 greatly affects its magnetic properties and therefore affects its performance as a hard bias layer. An insulation layer 348 may also be provided at the top of the hard bias layer 344. It should be pointed here too that the insulation layer 348 at the top of the hard bias layer 344, as well as the insulation layers 335, 337 at the top of the side shields 334, 336 (FIG. 3) can all be in the form of a single insulation layer, which can be for example $Al_2O_3$.

Because the hard bias layer 344 has a high coercivity, it has the property that its magnetic moment that maintains its orientation once it has been magnetized. Therefore, by applying a high magnetic field, the magnetic moment 350 of the hard bias layer 344 can be set as shown in a desired direction parallel with the ABS surface 338. Magnetostatic coupling between the hard bias layer 344 and the free layer 312 will cause the free layer 312 to have a magnetic moment 352 that is biased in direction parallel with the ABS as desired and antiparallel with the moment 350 of the hard bias layer 344.

Providing free layer biasing at the back edge of the sensor provides several advantages over the prior art hard biasing at the sides of the sensor. First, the bias layer 344 provides uniform biasing across the track width of the sensor, whereas prior art free layers were biased more strongly at the outer edges (at the edges of the track width) than at the center of the sensor. Another advantage is that biasing the free layer provides improved GMR response. A magnetic signal from a magnetic medium will be able to affect the magnetic moment of the free layer much more readily near the ABS surface 338 than at the back edge 340 of the sensor because the front edge 338 of the sensor is closer to the medium.

Since the free layer 312 is biased at the back edge 340, the front edge will be more responsive (ie. less magnetically stiff) than the back edge. Modeling has shown that this biasing arrangement provides significant signal response improvement. Another important advantage of placing the hard bias layer 344 at the back edge 340 of the sensor rather than at the sides 330, 332 is that this leaves room for the side magnetic shields 334, 336 to be formed. This is an important advantage, because in order to meet the needs of future high track density magnetic recording systems such side shielding will be critical to avoiding adjacent track interference.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A current perpendicular to plane (CPP) magnetoresistive sensor, comprising:
   a sensor stack having a front end adjacent to an air bearing surface (ABS) a back end opposite the front end, first and second laterally opposed sides, a top surface and a bottom surface;
   a bottom magnetic shield, constructed of an electrically conductive, magnetic material, electrically connected with the bottom surface of the sensor stack;
   a top magnetic shield, constructed of an electrically conductive, magnetic material, electrically connected with the top surface of the sensor stack;
   a layer of electrically insulating, conformally deposited alumina extending over the first and second sides of the sensor stack, the back end of the sensor stack, and over the bottom shield, the layer of electrically insulating, conformally deposited alumina also wraping around the first and second sides of the sensor stack;
   first and second side magnetic shields, constructed of a magnetic material, formed adjacent to the first and second sides of the sensor stack and extending laterally outward therefrom the layer of electrically insulating, conformally deposited alumina being disposed between each of the first and second side shields and the first and second sides of the sensor stack; and
   a hard magnetic bias structure formed adjacent to the back end of the sensor stack and extending laterally backward therefrom, the hard magnetic bias structure being electrically insulated from the sensor stack by the electrically insulating, conformally deposited alumina layer disposed therebetween.

2. A sensor as in claim 1, wherein each of the first and second shields is constructed of a low coercivity magnetic material.

3. A sensor as in claim 1, wherein each of the first and second shields is constructed of a material comprising Ni and Fe.

4. A sensor as in claim 1, wherein each of the first and second shields is constructed of a material consisting of Ni and Fe.

5. A sensor as in claim 1, wherein the hard bias structure comprises a layer of high coercivity magnetic material.

6. A sensor as in claim 1, wherein the hard bias structure comprises a layer of CoPtCr.

7. A sensor as in claim 1, wherein the hard bias structure comprises a layer of high coercivity magnetic material and a seed layer formed thereunder.

8. A sensor as in claim 1, wherein the hard bias structure comprises a layer of CoPtCr and an seed layer formed thereunder.

9. A sensor as in claim 1, wherein the hard bias structure comprises a layer of high coercivity material and an electrically conductive seed layer formed thereunder.

10. A sensor as in claim 1, wherein the insulation layer is a first insulation layer that covers the sides of the sensor stack, the back end of the sensor stack and at least a portion of the bottom shield, the sensor further comprising a second insulation layer disposed between the hard bias structure and the top shield.

11. A sensor as in claim 1, wherein the insulation layer is a first insulation layer that covers the sides of the sensor stack, the back end of the sensor stack and at least a portion of the bottom shield, the sensor further comprising a second insulation layer disposed between the hard bias structure and the top shield, between the first side shield and the top shield and between the second side shield and the top shield.

12. A sensor as in claim 1, wherein the insulation layer comprises conformal $Al_2O_3$.

13. A sensor as in claim 1, wherein the sensor stack further comprises:
    a magnetic free layer;
    a magnetic pinned layer structure; and
    a non-magnetic, electrically conductive spacer layer sandwiched between the free layer and the pinned layer structure.

14. A sensor as in claim 1, wherein the sensor stack further comprises:
    a magnetic free layer;
    a magnetic pinned layer structure; and
    a non-magnetic, electrically insulating barrier layer sandwiched between the free layer and the pinned layer structure.

15. A sensor as in claim 1, wherein:
    the sensor stack comprise a magnetic free layer;
    the hard bias structure has a magnetic moment that is biased in a direction parallel with the air bearing surface ABS; and
    the hard bias structure is magnetostatically coupled with the free layer.

16. A suspension assembly for use in a magnetic data recording system, the suspension comprising:
    a suspension arm;
    a slider having an air bearing surface (ABS) connected with the suspension arm; and
    a current perpendicular to plane (CPP) magnetoresistive sensor connected with the slider, the sensor comprising:
       a sensor stack having a front end adjacent to the air bearing surface (ABS) a back end opposite the front end, first and second laterally opposed sides, a top surface and a bottom surface;
       a bottom magnetic shield, constructed of an electrically conductive, magnetic material, electrically connected with the bottom surface of the sensor stack;
       a top magnetic shield, constructed of an electrically conductive, magnetic material, electrically connected with the top surface of the sensor stack;
       a layer of electrically insulating conformal alumina extending over the first and second sides of the sensor stack, the back end of the sensor stack, and the bottom shield;
       first and second side magnetic shields, constructed of a magnetic material, formed adjacent to the first and second sides of the sensor stack and extending laterally outward therefrom and being electrically insulated from the sensor stack by the layer of electrically insulating, conformal alumina disposed therebetween; and a hard magnetic bias structure formed adjacent to the back end of the sensor stack and extending laterally backward therefrom, the hard magnetic bias structure being electrically insulated from the sensor stack by the layer of electrically insulating, conformal alumina disposed therebetween.

17. A suspension assembly as in claim 16, wherein the first and second side shields each comprise CoFe and the hard magnetic structure comprises CoPtCr.

18. A disk drive system, comprising:
a housing;
a magnetic medium rotatably mounted within the housing;
an actuator pivotally mounted within the housing;
a suspension connected with the actuator;
a slider connected with the suspension for movement adjacent to a surface of the magnetic medium; and
a current perpendicular to plane (GPP) magnetoresistive sensor, the sensor comprising:
  a sensor stack having a front end adjacent to an air bearing surface (ABS) a back end opposite the front end, first and second laterally opposed sides, a top surface and a bottom surface;
  a bottom magnetic shield, constructed of an electrically conductive, magnetic material, electrically connected with the bottom surface of the sensor stack;
  a top magnetic shield, constructed of an electrically conductive, magnetic material, electrically connected with the top surface of the sensor stack;
  a layer of electrically insulating, extending over the first and second sides of the sensor stack, the back end of the sensor stack, and the bottom shield;
  first and second side magnetic shields, constructed of a magnetic material, formed adjacent to the first and second sides of the sensor stack and extending laterally outward therefrom and being electrically insulated from the sensor stack by the layer of electrically insulating, conformal alumina disposed therebetween; and
  a hard magnetic bias structure formed adjacent to the back end of the sensor stack and extending laterally backward therefrom, the hard magnetic bias structure being electrically insulated from the sensor stack by the layer of electrically insulating, conformally deposited alumina disposed therebetween.

19. A disk drive as in claim 18, wherein the first and second side shields each comprise CoFe and the hard magnetic structure comprises CoPtCr.

20. A disk drive as in claim 18, wherein the disk drive system is a perpendicular magnetic recording system wherein data is recorded as magnetic transitions oriented perpendicular to a plane of the magnetic medium.

* * * * *

UNITED STATES PATENT AND TRADEMARK OFFICE
CERTIFICATE OF CORRECTION

PATENT NO. : 7,333,304 B2  Page 1 of 1
APPLICATION NO. : 10/981903
DATED : February 19, 2008
INVENTOR(S) : Gill et al.

It is certified that error appears in the above-identified patent and that said Letters Patent is hereby corrected as shown below:

In claim 18, column 9, line 23, replace "(GPP)" with --(CPP)--.

Signed and Sealed this

Twenty-seventh Day of July, 2010

David J. Kappos
*Director of the United States Patent and Trademark Office*